(12) United States Patent
Chen et al.

(10) Patent No.: US 8,001,335 B2
(45) Date of Patent: *Aug. 16, 2011

(54) LOW LATENCY REQUEST DISPATCHER

(75) Inventors: Devereaux C. Chen, Cupertino, CA (US); Jeffrey R. Zimmer, Scotts Valley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/878,810

(22) Filed: Sep. 9, 2010

(65) Prior Publication Data

US 2011/0010474 A1    Jan. 13, 2011

Related U.S. Application Data

(63) Continuation of application No. 11/362,072, filed on Feb. 27, 2006, now Pat. No. 7,814,283, which is a continuation of application No. 10/087,826, filed on Mar. 5, 2002, now Pat. No. 7,039,770.

(51) Int. Cl.
*G06F 12/00* (2006.01)

(52) U.S. Cl. ........................ 711/151; 711/138

(58) Field of Classification Search .................. 711/151, 711/138
See application file for complete search history.

(56) References Cited

U.S. PATENT DOCUMENTS

| 5,517,671 | A | 5/1996 | Parks et al. |
| 5,928,354 | A | 7/1999 | Umeki et al. |
| 6,065,088 | A | 5/2000 | Bronson et al. |
| 7,039,770 | B1 | 5/2006 | Chen et al. |

OTHER PUBLICATIONS

Co-pending U.S. Appl. No. 11/362,072, filed Feb. 27, 2006 entitled "Low Latency Request Dispatcher", by Chen et al., 37 pages.
Microsoft Computer Dictionary, Copyright 1999, Microsoft Press, Fourth Edition, p. 187.

*Primary Examiner* — Midys Rojas
(74) *Attorney, Agent, or Firm* — Harrity & Harrity, LLP

(57) ABSTRACT

A first-in-first-out (FIFO) queue optimized to reduce latency in dequeuing data items from the FIFO. In one implementation, a FIFO queue additionally includes buffers connected to the output of the FIFO queue and bypass logic. The buffers act as the final stages of the FIFO queue. The bypass logic causes input data items to bypass the FIFO and to go straight to the buffers when the buffers are able to receive data items and the FIFO queue is empty. In a second implementation, arbitration logic is coupled to the queue. The arbitration logic controls a multiplexer to output a predetermined number of data items from a number of final stages of the queue. In this second implementation, the arbitration logic gives higher priority to data items in later stages of the queue.

20 Claims, 8 Drawing Sheets

US 8,001,335 B2

LOW LATENCY REQUEST DISPATCHER

RELATED APPLICATIONS

This application is a continuation of U.S. patent application Ser. No. 11/362,072, filed Feb. 27, 2006, which is a continuation of U.S. patent application Ser. No. 10/087,826, filed Mar. 5, 2002 (now U.S. Pat. No. 7,039,770), which are both incorporated herein by reference.

BACKGROUND OF THE INVENTION

A. Field of the Invention

The present invention relates generally to arbitration, and more particularly, to a high performance memory request dispatcher.

B. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was enabled.

To meet the new demands, purpose-built routers were designed. Purpose-built routers are designed and built with components optimized for routing. They not only handle higher line rates and higher network traffic volume, they also add functionality without compromising line rate performance.

A purpose-built router may include a number of input and output ports from which it transmits and receives information packets. A switching fabric may be implemented in the router to carry the packets between ports.

Packets received at a particular port are temporarily stored in memory while the router processes the packet to, for example, determine its appropriate output port. In a high-performance router, the large number of packets received can translate into a heavy burden on the memory. Accordingly, high-bandwidth and low-latency memories are typically used in the router. However, even with such high performance memories, processing a large number of memory requests may still cause system latency and thus slows down the operation of the router.

Accordingly, in certain devices such as high-performance routers, it is desirable to be able to efficiently and quickly dispatch memory requests.

SUMMARY OF THE INVENTION

An arbiter processes memory requests in a first-in-first-out (FIFO) order using a queue and corresponding components that minimize latency of the queue. In this manner, overall memory request latency is reduced.

A first aspect consistent with the invention is directed to a queue including a first queuing area configured to enqueue and dequeue data. A second queuing area receives data from the first queuing area when the first queuing area has data available to be dequeued. Bypass logic is coupled to the buffer. The bypass logic causes the data to bypass the first queuing area and to go straight to the second queuing area when the second queuing area is ready to receive data and the first queuing area is empty.

A method of masking latency in a queue is another aspect of the invention. The method includes receiving incoming data items for the queue and forwarding the incoming data items to a buffer when the queue is empty and the buffer is free to receive data items. Additionally, the method includes enqueuing the incoming data items to the queue when the queue contains data items or the buffer is not free to receive data items, and dequeuing data items from the queue to the buffer when the buffer is free to receive data items. Finally, the method includes transmitting the data items from the buffer as the output of the queue.

Yet another aspect consistent with the invention is directed to a network device. The network device includes a request manager configured to receive memory requests and a number of parallel processors configured to receive the memory requests from the request manager, and process the memory requests. A memory request arbiter receives the memory requests from the processors and transmits the memory requests to a memory system based on an arbitration scheme. The memory request arbiter includes an input port connected to receive the memory requests from the processors and a queue corresponding to each of the parallel processors. Each of the queues is configured to enqueue and dequeue memory requests of the corresponding parallel processor. The memory request arbiter additionally includes a buffer configured to receive memory requests dequeued from the queues when the queues contain memory requests and to receive memory requests directly from the input port when the queues do not contain memory requests.

Another aspect consistent with principles of the invention is directed to an arbiter. The arbiter includes a queue configured to enqueue input arbitration requests at a first stage of a number of stages and dequeue the arbitration requests at a last stage of the stages of the queue. Additionally, a multiplexer has a group of inputs connected to different stages of the queue and outputs selected ones of the arbitration requests read from the queue. Arbitration logic is coupled to the queue. The arbitration logic controls the multiplexer to output the selected ones of the input arbitration requests by selecting a predetermined number of arbitration requests from the queue during an arbitration cycle. The arbitration logic gives higher priority to arbitration requests in later stages of the queue.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

System Description

Figure 1:
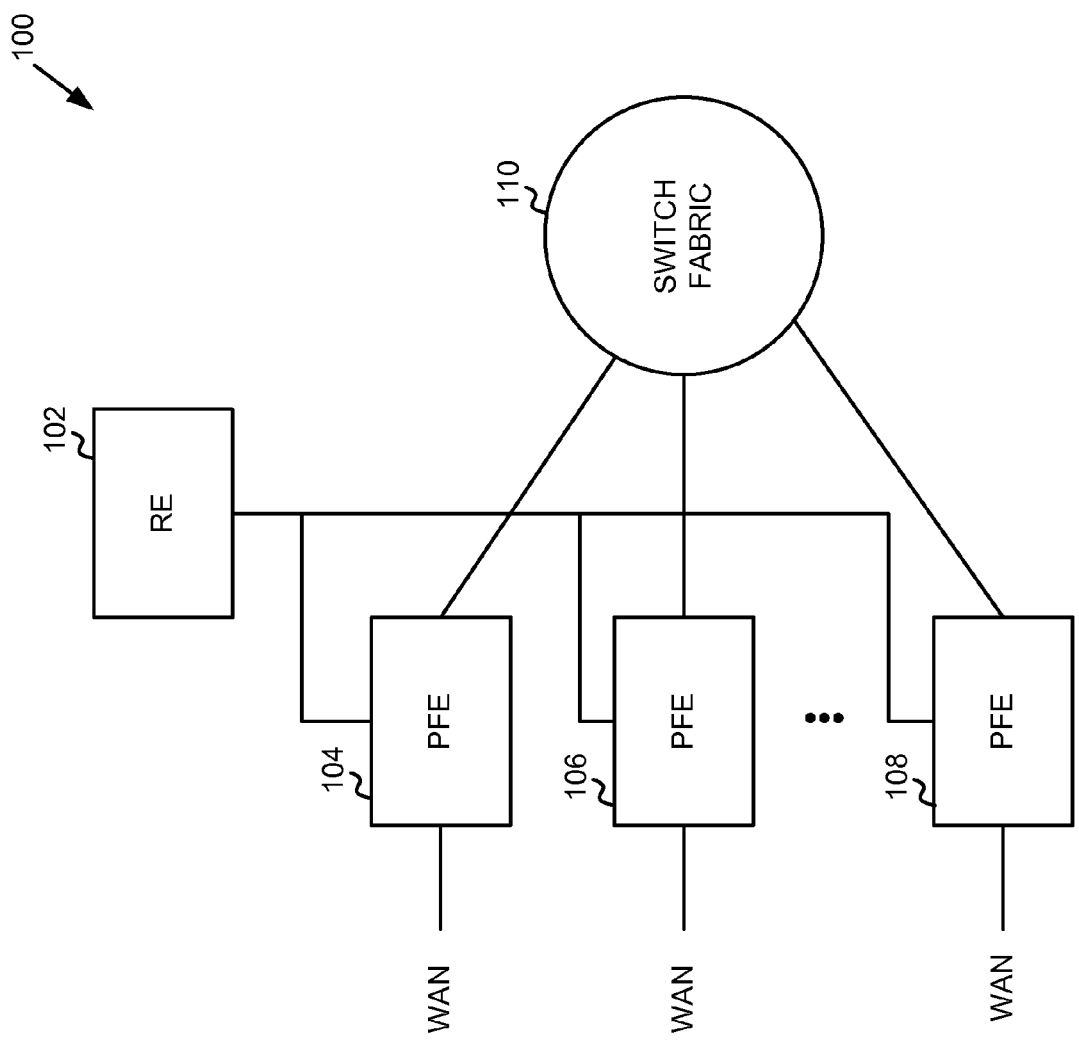
FIG. 1 is a block diagram illustrating an exemplary routing system in which systems and methods consistent with the principles of the invention may be implemented.

FIG. 1 is a block diagram illustrating an exemplary routing system 100 in which principles consistent with the invention may be implemented. System 100 includes packet forwarding engines (PFEs) 104, 106 ... 108, a switch fabric 110, and a routing engine (RE) 102. System 100 receives one or more data streams from a physical link, processes the data streams to determine destination information, and transmits the data streams out on links in accordance with the destination information.

RE 102 performs high-level management functions for system 100. For example, RE 102 communicates with other networks and systems connected to system 100 to exchange information regarding network topology. RE 102 creates routing tables based on network topology information and creates forwarding tables based on the routing tables and forwards the forwarding tables to PFEs 104, 106, and 108. PFEs 104, 106, and 108 use the forwarding tables to perform route lookup for incoming packets. RE 102 also performs other general control and monitoring functions for system 100.

PFEs 104, 106, and 108 are each connected to RE 102 and switch fabric 110. PFEs 104, 106, and 108 receive data at ports on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

PFE 104 will be used to discuss the operations performed by PFEs 104, 106, and 108 consistent with the principles of the invention. PFE 104 processes incoming data by stripping off the data link layer. PFE 104 converts header information from the remaining data into a data structure referred to as a notification.

For example, in one embodiment, the data remaining after the data link layer is stripped off is packet data. PFE 104 converts the layer 2 (L2) and layer 3 (L3) packet header information included with the packet data into a notification. PFE 104 stores the notification, some control information regarding the packet, and the packet data in a series of cells, where a cell is a unit of data having a fixed length (e.g., 64 bytes). In one embodiment, the notification and the control information are stored in the first two cells of the series of cells.

PFE 104 performs a route lookup using the notification and the forwarding table from RE 102 to determine destination information. PFE 104 may also further process the notification to perform protocol-specific functions, policing, and accounting, and might even modify the notification to form a new notification.

If the destination indicates that the packet should be sent out on a physical link connected to PFE 104, then PFE 104 retrieves the cells for the packet, converts the notification or new notification into header information, forms a packet using the packet data from the cells and the header information, and transmits the packet from the port associated with the physical link.

If the destination information requires that the packet should be sent to another PFE via switch fabric 110, then PFE 104 retrieves the cells for the packet, modifies the first two cells with the new notification and new control information, if necessary, and sends the cells to the other PFE via switch fabric 110. Before transmitting the cells over switch fabric 110, PFE 104 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, RE 102, PFEs 104, 106, and 108, and switch fabric 110 perform routing based on packet-level processing. The PFEs store each packet using cells while performing a route lookup. A packet might be received on one PFE and go back out to the network on the same PFE, or be sent through switch fabric 110 to be sent out to the network on a different PFE.

Figure 2:
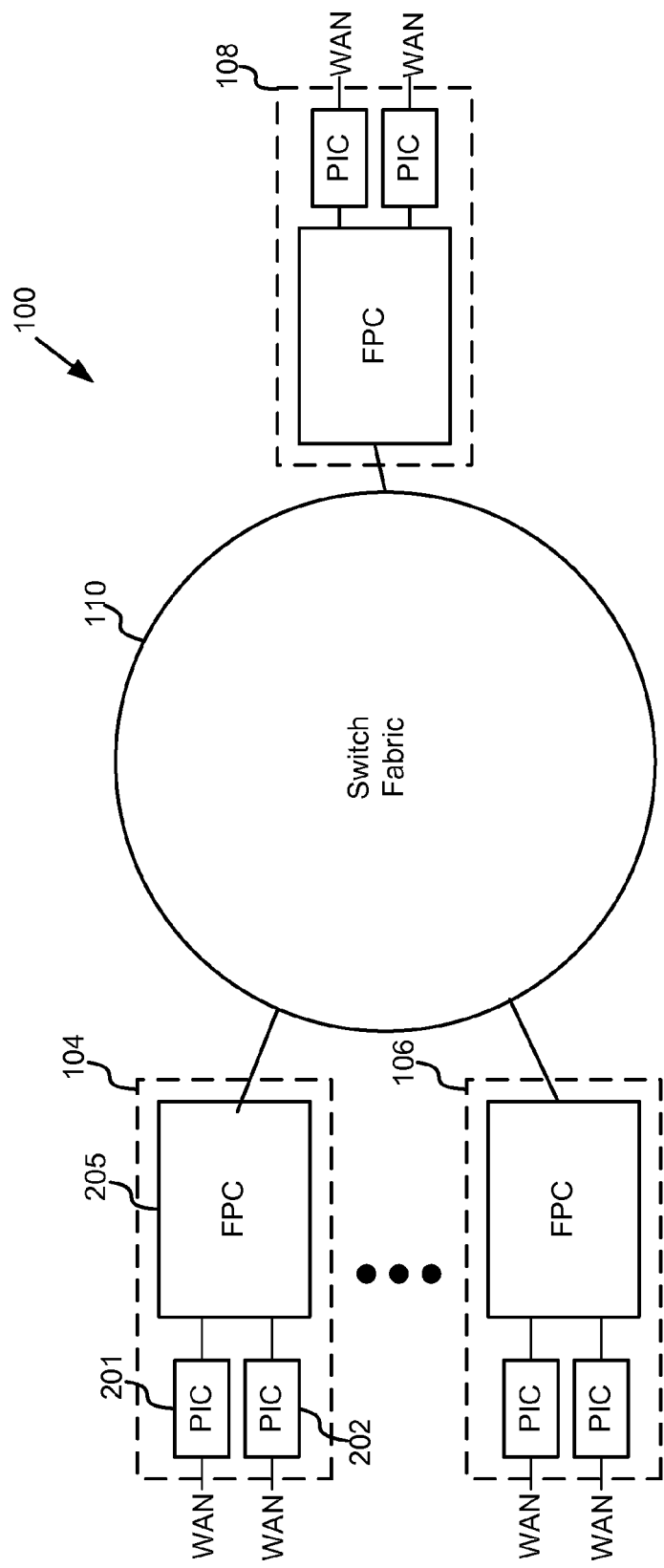
FIG. 2 is a detailed block diagram illustrating portions of the routing system shown in FIG. 1.

FIG. 2 is a detailed block diagram illustrating portions of routing system 100. PFEs 104, 106, and 108 connect to one another through switch fabric 110. Each of the PFEs may include one or more physical interface cards (PICs) 201-202 and flexible port concentrators (FPCs) 205.

PIC 201 transmits data between a WAN physical link and FPC 205. Different PICs are designed to handle different types of WAN physical links. For example, PIC 201 may be an interface for an optical link while PIC 202 may be an interface for an Ethernet link. Although FIG. 2 shows two PICs connected to the FPCs, in other implementations consistent with principles of the invention, there can be more or fewer PICs connected to an FPC.

Figure 3:
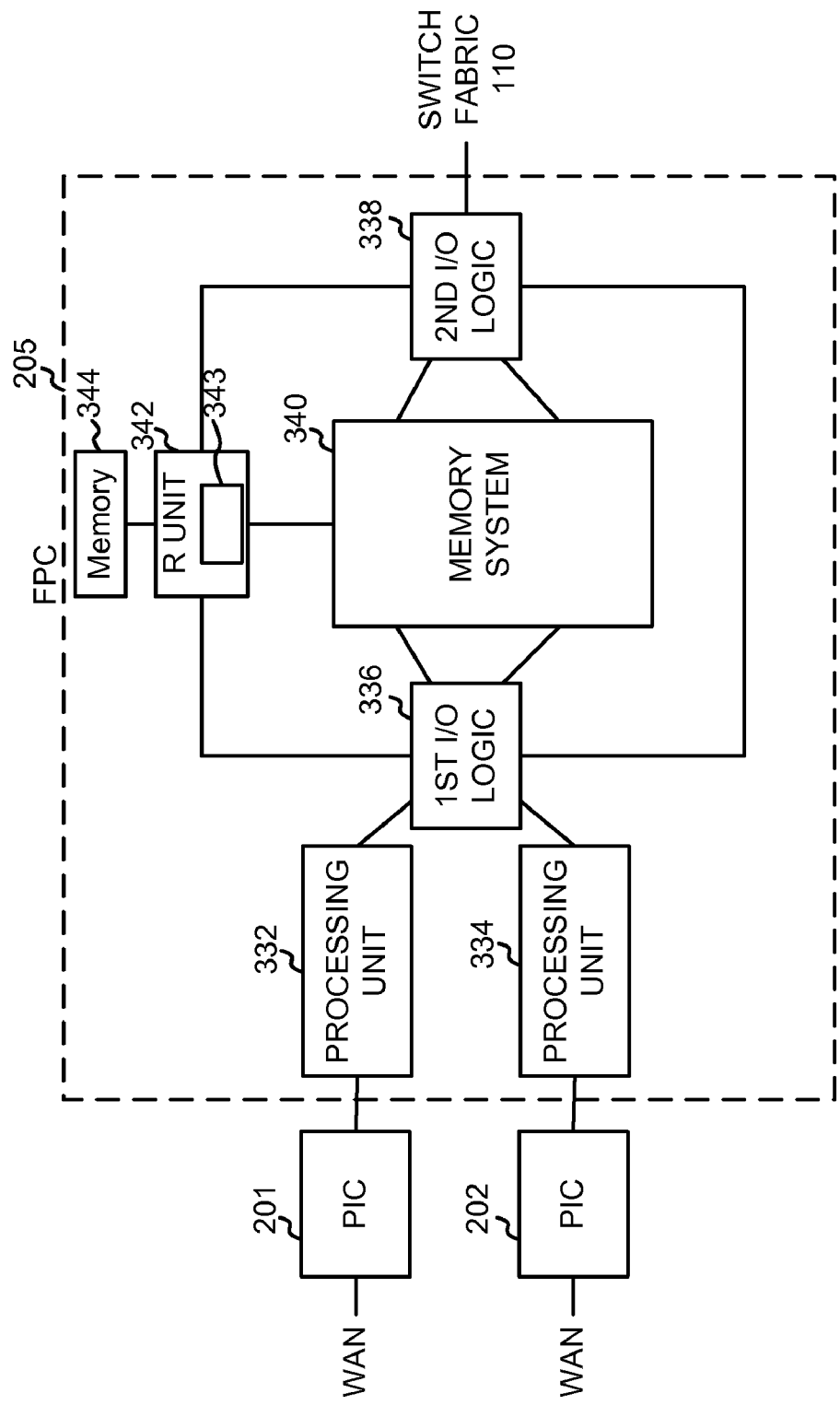
FIG. 3 is a diagram illustrating portions of FIG. 2 in additional detail.

FIG. 3 is an exemplary configuration of FPC 205 according to an implementation consistent with the principles of the invention. FPC 205 may include processing units 332 and 334, first input/output (I/O) logic 336, second I/O logic 338, memory system 340, memory 344, and R unit 342. Each processing unit 332 and 334 corresponds to one of PICs 201 or 202.

As will be described in greater detail below, processing units 332 and 334 may process packet data flowing between PICs 201 or 202 and first I/O unit 336. Each processing unit 332 and 334 may operate in two modes: a first mode for processing packet data received from the PIC connected to it, and a second mode for processing data received from first I/O unit 336.

In the first mode, processing unit 332 or 334 may process packets from PICs 201 or 202 to convert the packets into data cells, and transmit the data cells to first I/O unit 336. Data cells are the data structure used by FPC 205 internally for transporting and storing data. In one implementation, data cells are 64 bytes in length.

Packets received by processing unit 332 or 334 may include two portions: a header portion and a packet data portion. For each packet, processing unit 332 or 334 may process the header and insert the results of the processing into the data cells. For example, processing unit 332 or 334 might parse L2 and L3 headers of incoming packets and place the results in the data cells. The data stored in the data cells might also include some of the original header information, as well as processed header information. Processing unit 332 or 334 may also create control information based on the packet. The control information may be based on the packet header, the packet data, or both. Processing unit 332 or 334 may then store the processing results, control information, and the packet data in data cells, which it sends to first I/O logic 336.

In the second mode, processing unit 332 or 334 handles data flow in a direction opposite the first mode. In the second mode, processing unit 332 or 334 receives data cells from first I/O logic 336, extracts certain information and packet data from the data cells, and creates a packet based on the extracted information. Processing unit 332 or 334 creates the packet header from the information extracted from the data cells. In one embodiment, processing unit 332 or 334 creates L2 and L3 header information based on the extracted information. Processing unit 332 or 334 may load the packet data portion with the packet data from the data cells.

First I/O logic 336 and second I/O logic 338 coordinate data transfers into and out of FPC 205. Upon receiving data cells, first I/O logic 336 and second I/O logic 338 may extract certain information stored in the data cells, create a key based on the extracted information, and store the key in a notification. The key may contain information later used by R unit 342 to perform a route lookup for data cells received from processing unit 332 or processing unit 334, or route and encapsulation lookup, for data cells received from another PFE via switch fabric 120.

First I/O logic 336 and second I/O logic 338 may store the data cells in memory system 340. First I/O unit 336 and second I/O unit 338 may store, in the notification, address information identifying the locations of the data cells in memory system 340. The address information may be extracted from the notification later and used to read the data cells from memory system 340. First I/O logic 336 and second I/O logic 338 may send the notification to R unit 342. While first I/O logic 336 and second I/O logic 338 are shown as separate units, they may be implemented as a single unit in other embodiments consistent with the principles of the invention.

Memory system 340 may temporarily store data cells from first I/O logic 336 and second I/O logic 338 and notifications from R unit 342. Memory 340 may dispatch the notifications to first I/O logic 336 and second I/O logic 338. In response, first I/O logic 336 and second I/O logic 338 may use the address information in the notification to read out data cells from memory system 340 that correspond to a notification. The notification received from memory system 340 may have been modified by R unit 342 with route or encapsulation lookup results. First I/O logic 336 and second I/O logic 338 may update the data cells read out of memory system 340 with information from the modified notification. The data cells, which now include information from the modified notification, are sent to processing unit 332, processing unit 334, or switch fabric 110, depending on which of first I/O logic 336 or second I/O logic 338 is processing the notification.

R unit 342 may receive notifications from first I/O logic 336 and second I/O logic 338. R unit 342 may provide route lookup, accounting, and policing functionality based on the notifications. R unit 342 may receive one or more forwarding tables from RE 130 (FIG. 1, connection not shown) and use the keys, forwarding table(s), and encapsulation tables to perform route and encapsulation lookups. The tables and other information may be stored in memory 344. R unit 342 may insert the lookup result into a notification, which it may store in memory system 340.

R unit 342, in processing the notifications and performing the other functions noted above, may access memory 344. Memory requests for memory 344 may be handled by a memory request sub-component of R unit 342, labeled as component 343 in FIG. 3.

To increase system performance, it is desirable that responses to the memory requests be received with as little latency as possible. Additionally, in one implementation, the memory requests of R unit 342 are issued in a particular order and should be handled in the order that they are issued to maintain efficient processing. Thus, R unit 342, as well as processing the memory requests efficiently, should process the memory requests in the appropriate order.

Memory Request Arbitration

Figure 4:
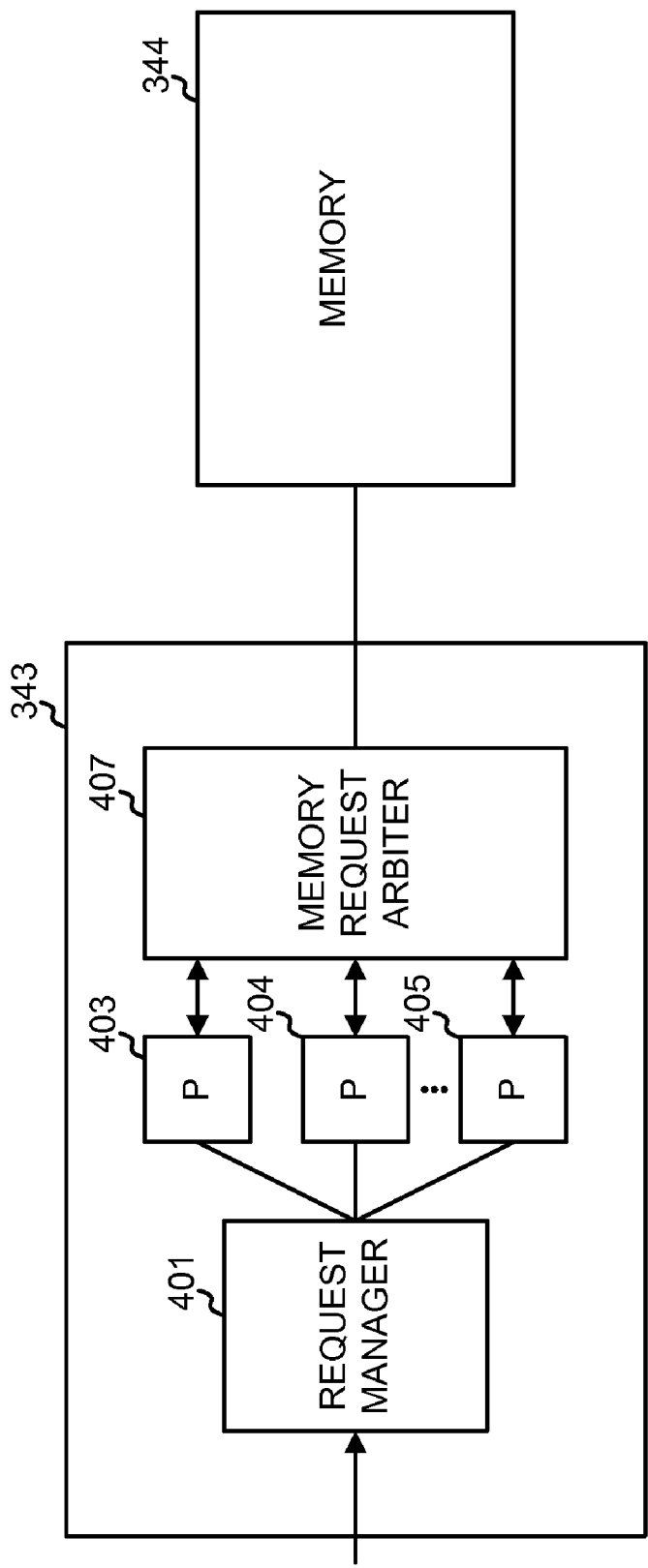
FIG. 4 is a diagram illustrating the memory request subcomponent of FIG. 3 in greater detail.

FIG. 4 is a diagram illustrating memory request sub-component 343 and memory 344. Memory request sub-component 343 includes request manager 401, processors 403-405, and memory request arbiter 407. Request manager 401 processes notifications from first I/O logic 336 and second I/O logic 338, and forwards notification processing requests to processors 403-405. Processors 403-405 forward memory requests to memory request arbiter 407. In one implementation, processors 403-405 may be key engines that receive keys from request manager 401. The key engines perform route look-ups for the keys in conjunction with memory 344. For example, there may be 28 key engines 403-405, each performing route look-ups for their received keys and generating memory requests in conjunction with the route look-ups.

Although multiple processors 403-405 are used in memory request sub-component 343 to increase the throughput of the memory requests, in other implementations, a single processor could be used to forward the memory requests to memory request arbiter 407. Each processor may include a single processing element or multiple processing elements or processor instances, and may operate in a context-switched manner.

In one implementation, memory requests are generated by R unit 342 as part of pipeline-based packet processing performed by the R unit. Accordingly, to avoid bubbles in the pipeline, the memory requests received by memory request arbiter 407 should be forwarded to memory 344 in the order in which they are received and with as few cycles of latency as possible between the requests.

Figure 5:
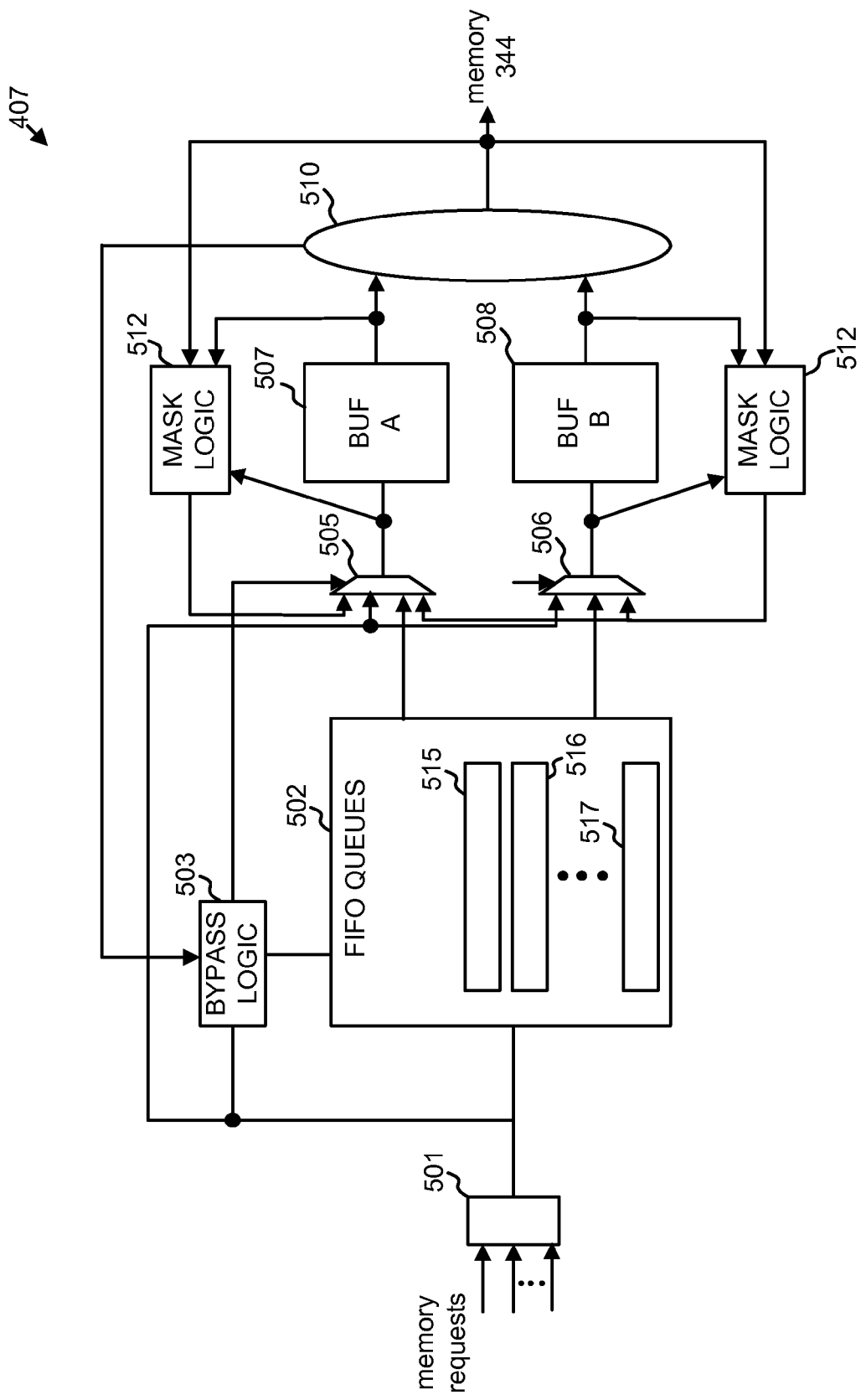
FIG. 5 is a diagram illustrating the memory request arbiter shown in FIG. 4 in additional detail.

An implementation of memory request arbiter 407 consistent with the principles of the invention is shown in more detail in FIG. 5. As discussed above, memory request arbiter 407 operates to forward memory requests to memory 344. Additionally, memory request arbiter 407 operates with a low average latency to increase the efficiency of memory request sub-component 343.

Memory request arbiter 407 includes memory request input port 501, a FIFO queue component 502, and bypass logic 503. Additionally, two high speed buffers, labeled as "BUF A" 507 and "BUF B" 508, are coupled to the output of FIFO queue component 502 through multiplexers 505 and 506, respectively. A priority encoding component 510 receives memory requests from buffers 507 and 508. Mask logic 512 provides feedback from the output of the buffers 507 and 508 to the input of multiplexers 505 and 506.

In each cycle, a set of parallel memory requests from processors 403-405 arrive at input port 501. In any given cycle, one, none, or all of the processors may initiate a memory request. In general, the received set of memory requests pass through sub-queues 515-517 of FIFO queue component 502 in a FIFO fashion to buffers 507 or 508. After requests are buffered in buffers 507 or 508, they can be forwarded to memory 344. In certain situations, however, bypass logic 503 controls multiplexers 505 and 506 to cause incoming memory requests to bypass FIFO queue component 502 and go straight to one of buffers 507 or 508. By bypassing FIFO queue component 502, latency associated with queuing and dequeuing memory requests into FIFO queue 502 is avoided.

Figure 6:
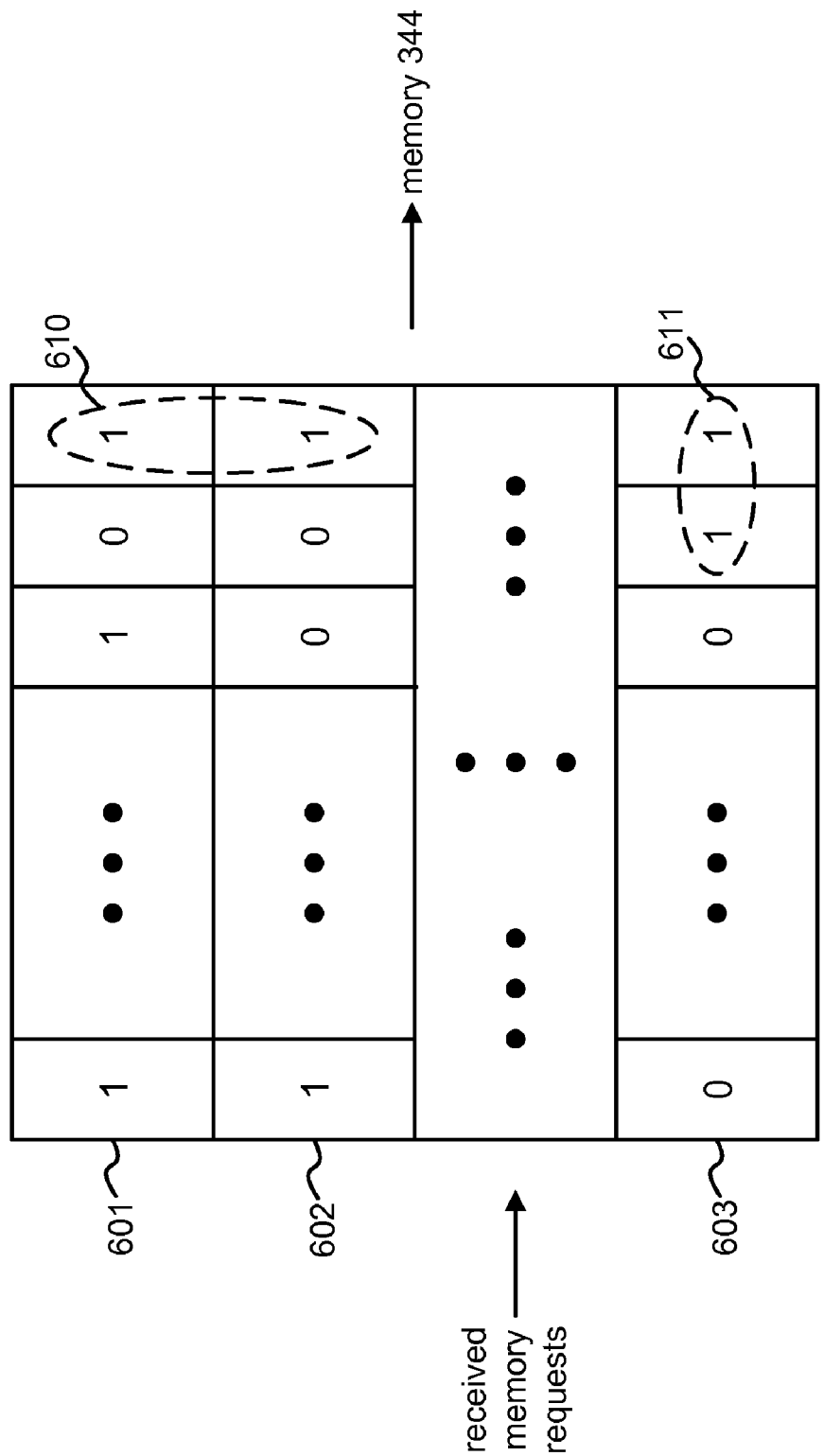
FIG. 6 is a diagram that conceptually illustrates the operation of the memory request arbiter.

FIG. 6 is a diagram that conceptually illustrates the operation of memory request arbiter 407 in transmitting memory requests to memory 344 at a macro level at which FIFO queues 502, Buf A 507, and Buf B 508 are conceptually illustrated as one unit. Buf A 507 can be considered the head column of requests, Buf B 508 the next column of requests, and the queues of FIFO queue component 502 the remaining column of requests. Memory request arbiter 407 includes a number of sub-queues 601-603, which receive memory requests from processors 403-405, respectively. Memory requests received by sub-queues 601-603 for a particular cycle are stored in a column across sub-queues 601-603. The columns may be processed sequentially from oldest to newest. For purposes of explaining the principles of the invention, queue entries in FIG. 6 marked with a "1" indicate that the processor associated with that queue has a memory request pending for that cycle, while queue entries marked with a "0" indicate that there is no memory request for the processor during that cycle. In operation, each queue location stores memory request information related to a particular packet.

In one implementation, memory 344 can handle two memory requests per clock cycle. Accordingly, if there are two or more memory requests pending in the head column of requests (i.e., Buf A 507) at a particular clock cycle, two memory requests can be simultaneously forwarded to memory 344. If there is only one memory request pending, requests from farther back in the sub-queues 601-603 may be used to avoid a memory request bubble. If more than two requests are pending in the head column of requests, the requests remaining after dequeuing the two requests must be delayed until at least the next clock cycle. This final situation is illustrated in FIG. 6, in which three requests are pending at the final stage of the sub-queues 601-603. In this situation, the two requests indicated by dashed oval 610 may be processed during a first clock cycle, while the two requests indicated by dashed oval 611 may be processed during a second, later clock cycle. In the second cycle one request comes from Buf A 507 and the other comes from Buf B 508.

Although the number of memory requests to process per clock cycle is illustrated as two herein, concepts consistent with the principles of the invention for processing the requests also apply to a system that can handle greater or less than two requests per clock cycle.

The operation of memory request arbiter 407 in implementing a zero latency FIFO queue, such as the theoretical FIFO queue shown in FIG. 6, will now be described in additional detail. Referring back to FIG. 5, FIFO queue component 502 includes a series of sub-queues 515-517, respectively, corresponding to each processor 403-405. Sub-queues 515-517 will introduce latency into received memory requests. Bypass logic 503, multiplexers 505 and 506, buffers 507 and 508, mask logic 512, and priority encoder 510 augment FIFO queue component 502 to mask the inherent FIFO latency.

Typically, sets of memory requests received at input port 501 are enqueued into FIFO queue component 502. If, however, one or both of buffers 507 or 508 are open and FIFO queue component 502 is empty, bypass logic 503 forwards the received memory requests to buffers 507 and 508, depending on whether one or both are open. The memory requests are forwarded through multiplexer 505 or 506 to the appropriate one of buffers 507 or 508. On the other hand, if both of buffers 507 and 508 contain memory requests or FIFO queue component 502 contains memory requests, the received memory requests are enqueued to FIFO queue component 502 in sub-queues 515-517. In this situation, FIFO queue component 502 dequeues memory requests to buffers 507 and 508 as space becomes available in the buffers.

Figure 7:
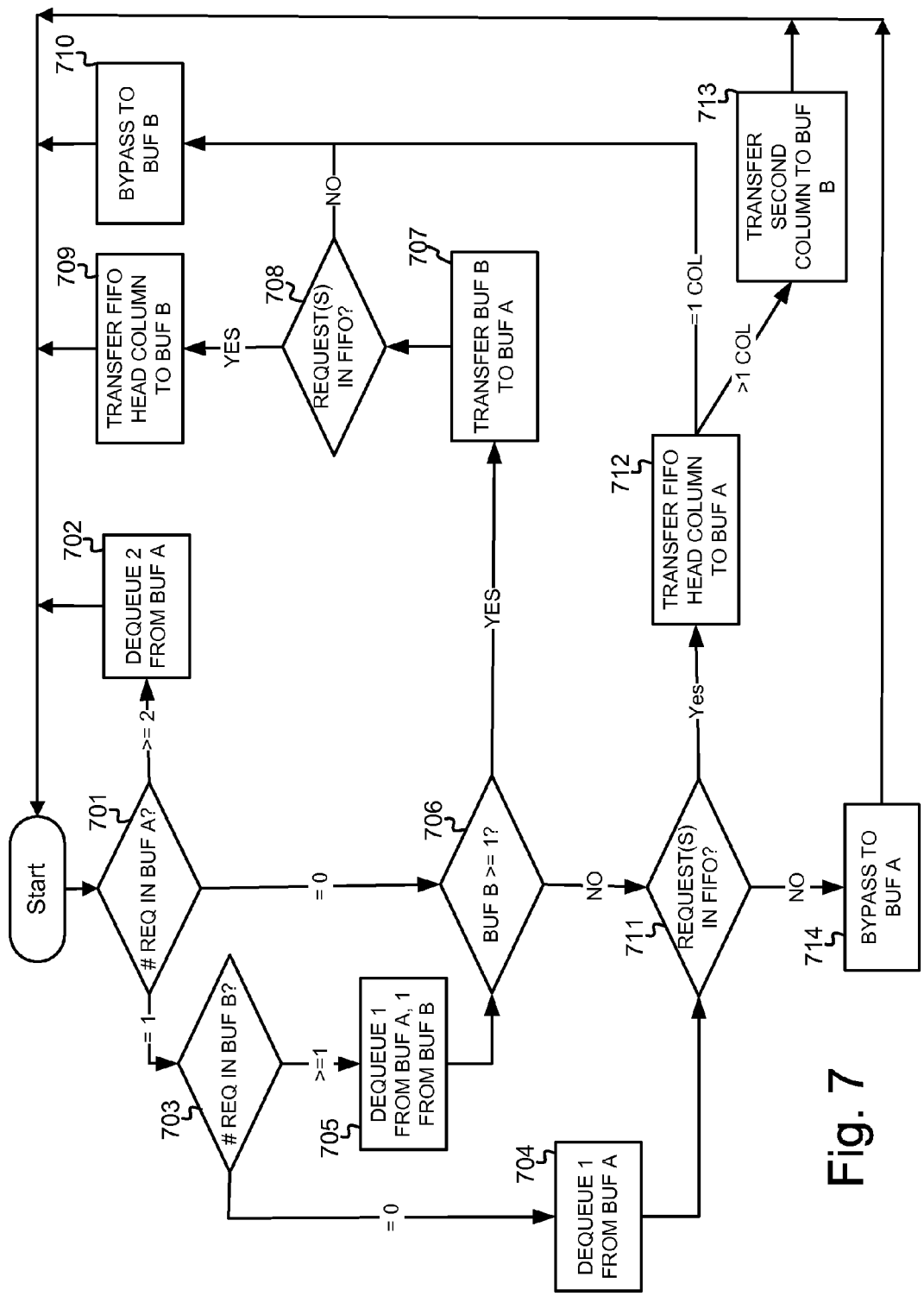
FIG. 7 is a flow chart illustrating the operation of the memory request arbiter in processing and transmitting memory requests.

FIG. 7 is a flow chart illustrating the operation of memory request arbiter 407 in additional detail. In general, in each cycle, memory requests received from processors 403-405 are transmitted to FIFO queue component 502, Buf A 507, or Buf B 508. For each cycle, memory request arbiter 407 begins by checking the number of requests pending in Buf A 507 (act 701). If there are two or more than two requests in Buf A 507, encoding component 510 reads two memory requests from Buf A 507 and forwards them to memory 344 (act 702). If, however, there is only a single request in Buf A 507, encoding component 510 also checks the number of requests in Buf B 508 (step 703). In this case, if there are no requests in Buf B 508, then encoding component 510 dequeues the single request from Buf A 507 to memory 344 (act 704). When there are one or more memory requests in Buf B 508, however, one request is dequeued from Buf A 507 and one from Buf B 508 (act 705).

Encoding component 510 reaches act 706 after Buf A had either one or zero memory requests. At this point, if Buf B 508 has one or more memory requests, they are transferred to Buf A 507 (acts 706 and 707). More specifically, in transferring the memory requests to Buf A 507, mask logic 512 masks the identifications of the memory requests that were just forwarded to memory 344 (if any), and the masked list of memory requests is copied back into Buf A through multiplexer 505. A similar process is performed to recycle memory requests in Buf B back to Buf B, through mask logic 512 and multiplexer 506, when Buf B contains one or more pending memory requests that were not transferred to Buf A. If, at this point, there are additional requests in FIFO queues 592, the head column in the FIFO 502 is transferred to Buf B 508 (acts 708 and 709). If there are no requests in FIFO 502, additional requests received by memory requests arbiter 407 are bypassed straight to Buf B 508 (act 710).

Referring to act 706, if Buf B 508 does not contain at least one memory request, and there are requests in FIFO 502, one or two columns are transferred out of FIFO 502 (act 711). In particular, if FIFO 502 contains a single column, it is transferred to Buf A 507 (act 712). If the FIFO contains two columns, the second column of memory requests is transferred to Buf B 508 (act 713). If, however, referring back to act 711, there are no requests in FIFO 502, then the next column received by memory request arbiter 407 is bypassed to Buf A 507 (act 714).

To review, as shown in the flow chart of FIG. 7, columns of memory requests are loaded into Buf A. Memory requests are removed from Buf A two at a time. If only one memory request is available from Buf A, the second memory requests may be removed from Buf B. When Buf A is empty, the next column of memory requests is moved into Buf B from Buf A (or from FIFO 502 if Buf B is empty).

As described above, memory arbiter 407, including Buf A 507 and Buf B 508, function as a low latency FIFO queue that arbitrates among parallel memory requests. Buf A 507, Buf B 508, and the circuitry that supports these two buffers, effectively masks the latency of traditional FIFO queues 502.

Figure 8:
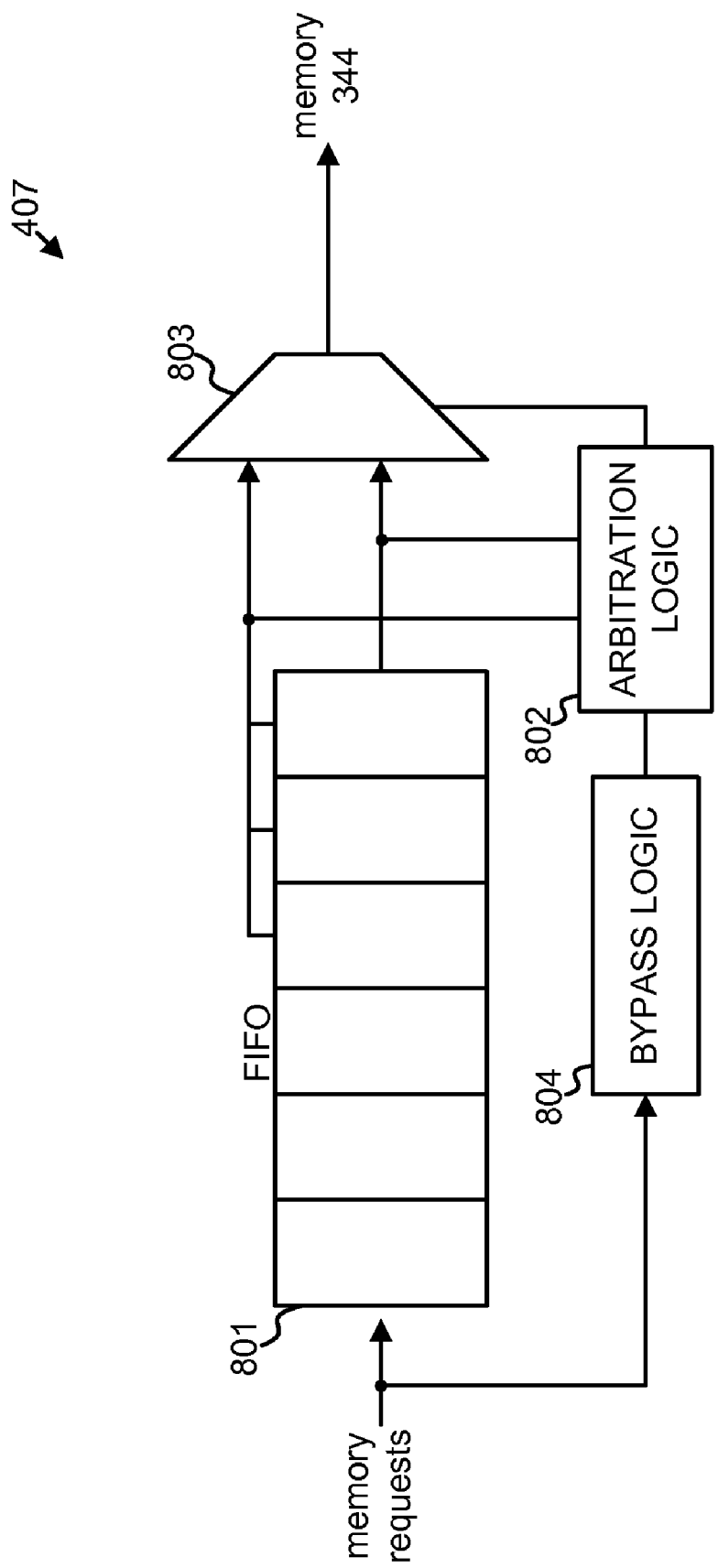
FIG. 8 is a diagram of an alternate implementation of a memory request arbiter consistent with principles of the invention.

FIG. 8 is a high-level diagram of an alternate implementation of memory request arbiter 407. The memory request arbiter of FIG. 8 is functionally identical to the memory request arbiter shown in FIG. 5. As shown, the arbiter of FIG. 8 includes a modified FIFO 801, an arbitration logic 802, a multiplexer 803, and bypass logic 804.

In operation, modified FIFO 801 may function as a normal FIFO, in which sets of incoming memory requests are enqueued and dequeued in FIFO order. In addition, however, FIFO 801 includes links to arbitration logic 802, in which the first N entries (N is shown as three in FIG. 8) are input to arbitration logic 802 and multiplexer 803. Arbitration logic 802, based on the input first N entries of FIFO 801, may control multiplexer 803 to forward selected memory requests from the first N entries of FIFO 801 to memory 344. In this manner, memory requests from different stages of the pipeline may be read from FIFO 801 and transmitted through multiplexer 801 in the same clock cycle. Accordingly, if a stage of the FIFO 801 only has one pending memory request, arbitration logic 802 may cause additional memory requests from a later stage to also be read from FIFO 801, thus filling the memory request per cycle capacity of the memory system.

Bypass logic 804 controls input memory requests to bypass FIFO 801 when memory requests are received and FIFO 801 is not processing previously enqueued requests. In one implementation, memory system may receive up to two memory requests per cycle. Accordingly, as long as a set of incoming memory requests only contains two or fewer active memory requests, bypass logic 804 may continue to bypass FIFO 801 and send the memory requests directly to the memory system. When more than two memory requests are active in a set of input memory requests, at least one memory request is enqueued into FIFO 801. Accordingly, subsequently received memory requests are also enqueued to FIFO 801 until FIFO 801 empties.

Modified FIFO queue 801, as described above, primarily implements a FIFO based arbitration scheme for incoming memory requests. Through the operation of arbiter logic 802, bypass logic 804, and multiplexer 801, however, FIFO queue 801 is modified such that potential latency introduced when dequeuing memory requests is reduced.

CONCLUSION

Devices and methods for functionally implementing a low latency FIFO queue were described above. In the particular implementations discussed, the FIFO queues are used to arbitrate among a potential group of memory requests received during any single clock cycle.

Although the above descriptions have been in the context of a memory request arbiter, the concepts consistent with the invention are not limited to a memory request arbiter. For example, the general low-latency FIFO queue described herein may be applied to any application that requires a high performance FIFO queue.

It will be apparent to one of ordinary skill in the art that the embodiments as described above may be implemented in many different forms of software, firmware, and hardware in the entities illustrated in the figures. The actual specialized control hardware used to implement aspects consistent with principles of the invention is not limiting of the present invention.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A queue comprising:
   a first queue to enqueue and dequeue data units, the first queue including a plurality of parallel sub-queues that queue a plurality of data units;
   a second queue to receive data units from the first queue when the first queue has data units available to be dequeued, the second queue including a first buffer to store a first set of the data units and a second buffer, having a lower output priority than the first buffer, to store a second set of the data units; and
   a mask component coupled to an output of the first and second buffers, the mask component to restore data units to the first and second buffers that were not output from the first and second buffers.

2. The queue of claim 1, where the data units comprise memory access requests.

3. The queue of claim 1, further comprising:
   a multiplexer including a plurality of inputs connected to different stages of the first queue.

4. The queue of claim 3, further comprising:
   an arbitration component to control the multiplexer to output selected ones of the data units read from the first queue to the second queue.

5. The queue of claim 1, further comprising:
   an encoding component to read data units from the first and second buffers, where the encoding component assigns data units in the first buffer a higher priority than data units in the second buffer.

6. A network device comprising:
   a request manager to receive memory requests;
   a plurality of parallel processors to receive the memory requests from the request manager; and
   a memory request arbiter to receive the memory requests from the plurality of processors, the memory request arbiter transmitting the memory requests to a memory system based on an arbitration scheme, the memory request arbiter including:
     an input port to receive the memory requests from the plurality of parallel processors,
     a plurality of queues, each of the plurality of queues corresponding to one parallel processor of the plurality of parallel processors, each of the plurality of queues to enqueue and dequeue memory requests of the corresponding parallel processor,
     a buffer to receive memory requests dequeued from the plurality of queues when the plurality of queues include memory requests and to receive memory requests directly from the input port when the plurality of queues do not include memory requests, where the buffer further comprises:
       a first buffer storing memory requests that are higher priority memory requests, and
       a second buffer storing the memory requests that are lower priority memory requests, where the memory requests in the second buffer are moved to the first buffer when the first buffer is free to receive the lower priority memory requests.

7. The network device of claim 6, where the memory request arbiter further comprises:
a mask component coupled to an output of the first and second buffers, the mask component to restore memory requests to the first and second buffer that were not output from the first and second buffers.

8. The network device of claim 6, where the memory request arbiter further comprises:
a bypass component coupled to the buffer and the queues, the bypass component causing the received memory requests to bypass the queues and to be received directly by the buffer.

9. The network device of claim 8, further comprising:
an encoding component to read memory requests from the first and second buffers, where the encoding component gives memory requests in the first buffer higher priority than memory requests in the second buffer.

10. The network device of claim 9, where the encoding component is further to read multiple memory requests per clock cycle from the first and second buffers.

11. The network device of claim 6, where the network device includes a network router.

12. A device, comprising:
an input port to receive incoming data items;
a queue to receive the incoming data items from the input port and store the incoming data items;
a buffer to receive the incoming data items from the queue, the buffer further comprising:
 a first buffer to store the incoming data items that are higher priority data items, and
 a second buffer to store the incoming data items that are lower priority data items,
 where the incoming data items in the second buffer are moved to the first buffer when the first buffer is free to receive the lower priority data items;
a bypass component to send the received incoming data items to the buffer without storing the incoming data items in the queue when the queue is empty and the buffer is free to receive the data items.

13. The device of claim 12, where the queue is further to:
enqueue the incoming data items in the queue when the queue includes data items or the buffer is not free to receive data items.

14. The device of claim 12, where the queue is further to:
dequeue the incoming data items stored in the queue to the buffer when the buffer is free to receive data items.

15. The device of claim 12, further comprising:
a multiplexer including a plurality of inputs connected to different stages of the queue, the multiplexer outputting selected ones of the incoming data items read from the queue to the buffer.

16. The device of claim 12, where the incoming data items are memory access requests.

17. The device of claim 12, further comprising:
a priority encoding component to:
 read the incoming data items from the buffer, and
 forward the incoming data items to a memory, where the memory is different than the queue and the buffer.

18. The device of claim 17, where the priority encoding component is further to:
read the incoming data items from the first buffer before reading the incoming data items in the second buffer.

19. The device of claim 12, where the queue further comprises:
a plurality of sub-queues that each correspond to one of a plurality of processors.

20. The device of claim 12, further comprising:
a mask component coupled to an output of the first and second buffers, the mask component to restore data units to the first and second buffer that were not output from the first and second buffers.

* * * * *